(12) United States Patent
Kado

(10) Patent No.: US 12,521,183 B2
(45) Date of Patent: Jan. 13, 2026

(54) MEDICAL CONTROL DEVICE AND MEDICAL OBSERVATION SYSTEM

(71) Applicant: Sony Olympus Medical Solutions Inc., Tokyo (JP)

(72) Inventor: Masataka Kado, Tokyo (JP)

(73) Assignee: Sony Olympus Medical Solutions Inc., Tokyo (JP)

(*) Notice: Subject to any disclaimer, the term of this patent is extended or adjusted under 35 U.S.C. 154(b) by 895 days.

(21) Appl. No.: 17/551,818

(22) Filed: Dec. 15, 2021

(65) Prior Publication Data

US 2022/0233245 A1    Jul. 28, 2022

(30) Foreign Application Priority Data

Jan. 28, 2021 (JP) ................................. 2021-011862

(51) Int. Cl.
| | |
|---|---|
| A61B 34/20 | (2016.01) |
| A61B 90/00 | (2016.01) |
| A61B 90/20 | (2016.01) |
| A61F 9/007 | (2006.01) |
| G06T 7/73 | (2017.01) |
| G16H 30/40 | (2018.01) |
| G16H 40/40 | (2018.01) |

(52) U.S. Cl.
CPC .......... *A61B 34/20* (2016.02); *A61F 9/00754* (2013.01); *G06T 7/73* (2017.01); *G16H 30/40* (2018.01); *G16H 40/40* (2018.01); *A61B 2034/2055* (2016.02); *A61B 2034/2065* (2016.02); *A61B 90/20* (2016.02); *A61B 2090/373* (2016.02); *G06T 2207/30041* (2013.01)

(58) Field of Classification Search
None
See application file for complete search history.

(56) References Cited

U.S. PATENT DOCUMENTS

| | | | |
|---|---|---|---|
| 6,099,522 A | | 8/2000 | Knopp |
| 2016/0324418 A1* | | 11/2016 | Bishop ..................... A61B 3/14 |
| 2017/0075100 A1 | | 3/2017 | Awdeh |
| 2018/0049622 A1* | | 2/2018 | Ryan et al. ............... A61B 1/00 |

(Continued)

FOREIGN PATENT DOCUMENTS

| | | | | |
|---|---|---|---|---|
| AU | 2017200769 A1 * | 3/2017 | ............... | H04N 7/18 |
| CA | 3033576 A1 * | 4/2018 | ............. | A61F 9/007 |
| CN | 105792783 A * | 7/2016 | ............. | A61B 46/10 |

(Continued)

*Primary Examiner* — Vu Le
*Assistant Examiner* — Matthew James Bodnark
(74) *Attorney, Agent, or Firm* — XSENSUS LLP

(57) ABSTRACT

A medical control device includes: determination circuitry configured to determine whether or not a specific surgical tool is included in a captured image based on an image signal generated by an imaging device configured to capture an image of a subject eye; image generation circuitry configured to generate an image for display based on the image signal; and a state controller configured to control, in a case where the determination circuitry determines that the specific surgical tool is not included in the captured image, operation of the image generation circuitry or an imaging field of view by the imaging device so as to maintain a state of the subject eye in the image for display.

20 Claims, 9 Drawing Sheets

(56) References Cited

U.S. PATENT DOCUMENTS

2020/0146885 A1\* 5/2020 Ootsuki et al. ........ A61B 34/25

FOREIGN PATENT DOCUMENTS

| | | | | |
|---|---|---|---|---|
| CN | 115244361 A | * | 10/2022 | ............. H04N 23/10 |
| JP | 2004173043 A | * | 6/2004 | ................ H04N 7/18 |
| JP | WO2018105411 A1 | * | 6/2018 | |
| JP | 2018525076 A | * | 9/2018 | ........... A61F 9/0082 |
| JP | 2020014799 A | * | 1/2020 | ................ A61B 6/00 |
| JP | WO2020138497 A1 | * | 7/2020 | ........... H04N 23/675 |
| JP | 2020130607 A | | 8/2020 | |
| WO | 2017/065018 A1 | | 4/2017 | |
| WO | WO-2019197951 A2 | | 10/2019 | |

\* cited by examiner

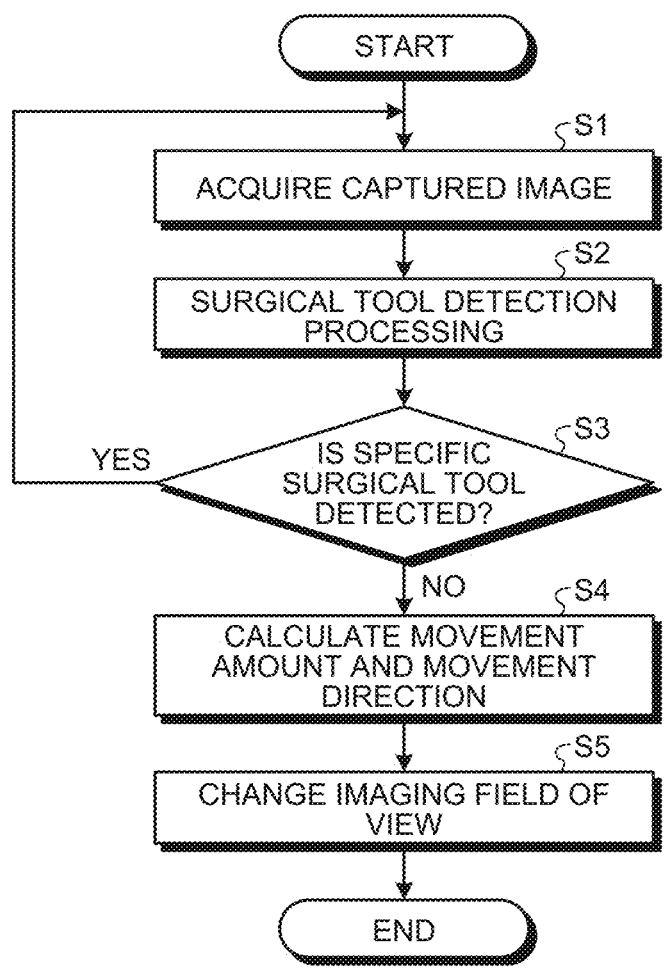

MEDICAL CONTROL DEVICE AND MEDICAL OBSERVATION SYSTEM

CROSS-REFERENCE TO RELATED APPLICATION

This application claims priority from Japanese Application No. 2021-011862, filed on Jan. 28, 2021, the contents of which are incorporated by reference herein in its entirety.

BACKGROUND

The present disclosure relates to a medical control device and a medical observation system.

A medical observation system has been known which is used for eye surgery such as cataract surgery (see, for example, WO 2017/065018 A).

According to a medical observation system described in WO 2017/065018 A, a captured image obtained by capturing an image of a subject eye with an imaging device is displayed in a display device. Then, a doctor performs surgery while confirming the captured image displayed in the display device.

SUMMARY

In the meantime, examples of a situation where a center position of the subject eye in the screen of the display device moves include: a first case where pressure is applied to the subject eye by the doctor performing a specific procedure, and a second case where a patient changes his/her posture or the patient moves his/her line of sight.

Here, in the first case, when the specific procedure is finished, no more pressure is applied to the subject eye and the center position of the subject eye in the screen returns to the original position. Thus, in the first case, the doctor operates the medical observation system to change the imaging field of view, which eliminates the need to change the center position of the subject eye in the screen. On the other hand, in the second case, the doctor operates the medical observation system to change the imaging field of view, which involves complicated work of changing the center position of the subject eye in the screen to an appropriate position.

There is a need for a technique that eliminates the need for the complicated work to improve convenience.

According to one aspect of the present disclosure, there is provided a medical control device including: determination circuitry configured to determine whether or not a specific surgical tool is included in a captured image based on an image signal generated by an imaging device configured to capture an image of a subject eye; image generation circuitry configured to generate an image for display based on the image signal; and a state controller configured to control, in a case where the determination circuitry determines that the specific surgical tool is not included in the captured image, operation of the image generation circuitry or an imaging field of view by the imaging device so as to maintain a state of the subject eye in the image for display.

BRIEF DESCRIPTION OF THE DRAWINGS

FIG. 4 is a flowchart depicting operation of a control device;

DETAILED DESCRIPTION

Hereinafter, modes for carrying out the present disclosure (embodiments below) will be described with reference to the drawings. Note that the present disclosure is not limited to the embodiments described below. Further, the same parts are denoted by the same reference signs when the drawings are described.

Schematic Configuration of Medical Observation System

Figure 1:
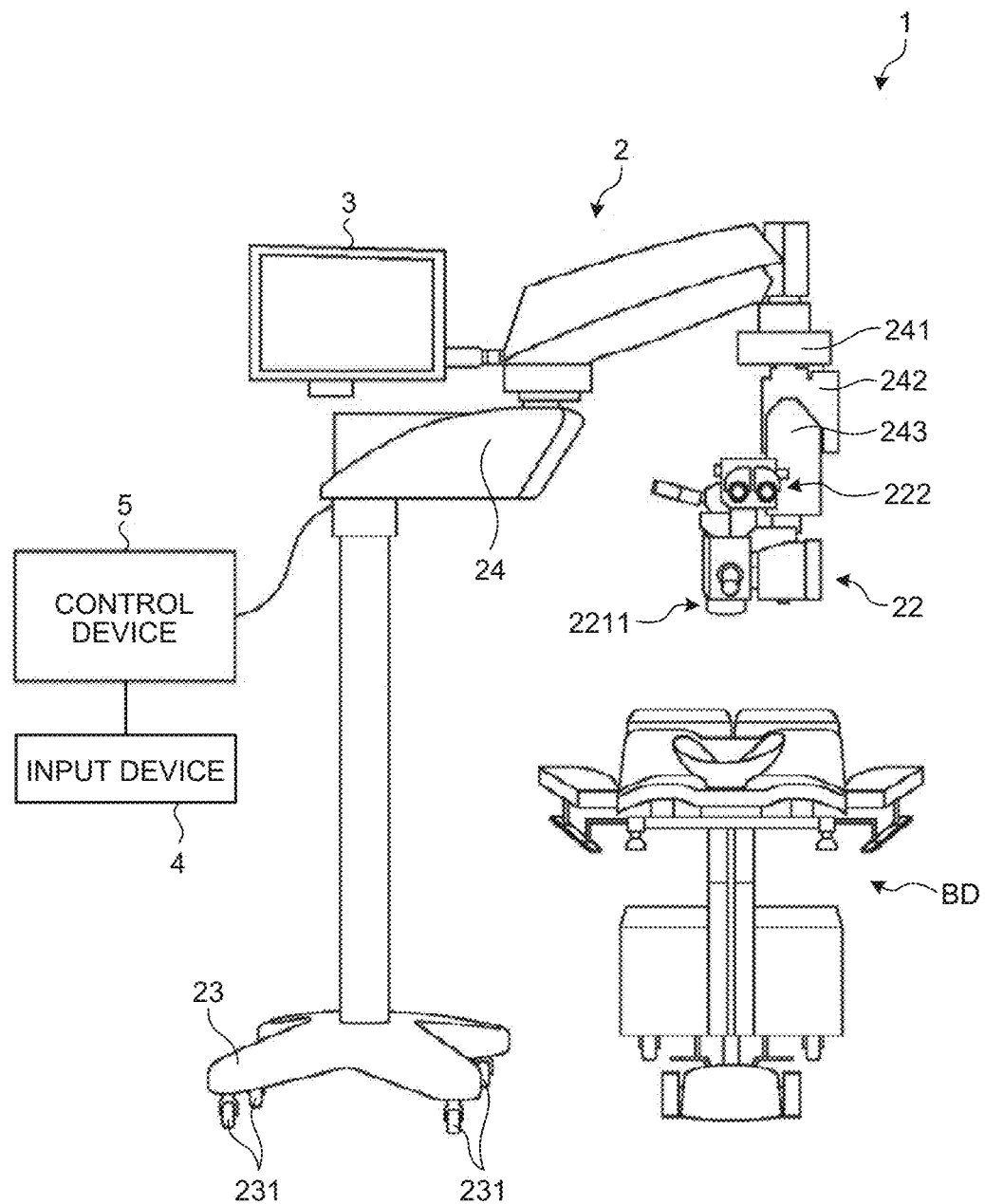
FIG. 1 is a diagram for explanation of a configuration of a medical observation system according to an embodiment.
Figure 2:
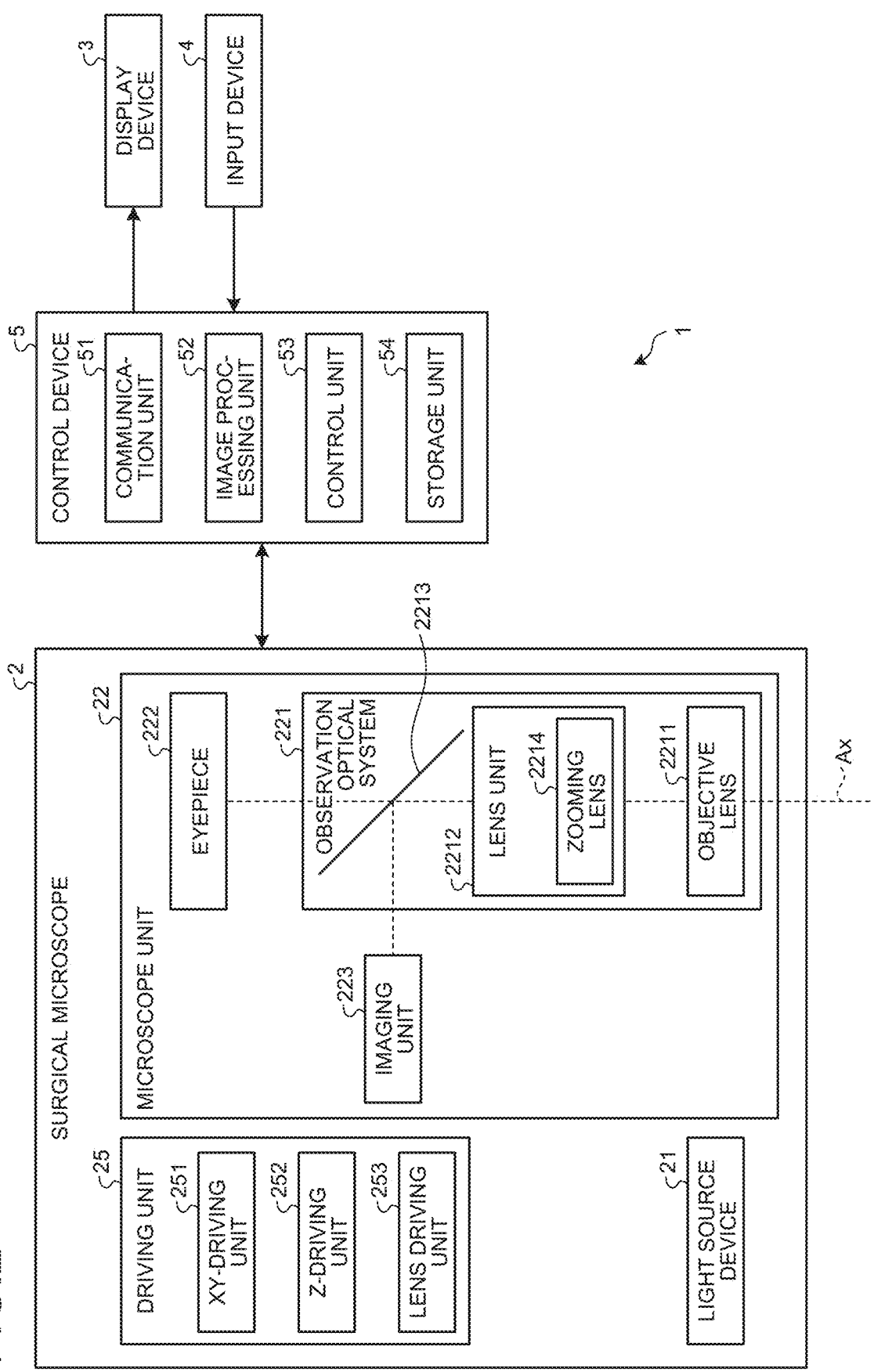
FIG. 2 is a diagram for explanation of a configuration of a medical observation system according to an embodiment.

FIGS. 1 and 2 are diagrams for explanation of a configuration of a medical observation system 1 according to an embodiment. Specifically, FIG. 1 is a diagram illustrating an external configuration of the medical observation system 1. FIG. 2 is a block diagram illustrating a configuration of the medical observation system 1.

The medical observation system 1 is a system used for surgery on an eye of a patient who lies on a patient bed BD (FIG. 1), the eye being hereinafter referred to as a "subject eye". As illustrated in FIG. 1 or FIG. 2, the medical observation system 1 includes a surgical microscope 2, a display device 3, an input device 4, and a control device 5.

The surgical microscope 2 captures an image of the subject eye under the control of the control device 5. As illustrated in FIG. 1 or FIG. 2, the surgical microscope 2 includes a light source device 21 (FIG. 2), a microscope unit 22, a base unit 23 (FIG. 1), a supporting unit 24 (FIG. 1), and a driving unit 25 (FIG. 2).

The light source device 21 supplies, under the control of the control device 5, illumination light to illuminate the subject eye.

The microscope unit 22 corresponds to an imaging device according to the present disclosure. As illustrated in FIG. 1 or FIG. 2, this microscope unit 22 includes an observation optical system 221 (FIG. 2), an eyepiece 222, and an imaging unit 223 (FIG. 2).

The observation optical system 221 includes an objective lens 2211 (FIG. 1, FIG. 2), a lens unit 2212 (FIG. 2), and a half mirror 2213 (FIG. 2), and guides light reflected from the subject eye to the eyepiece 222 and the imaging unit 223. To be specific, the light reflected from the subject eye enters the half mirror 2213 through the objective lens 2211 and the lens unit 2212. The approximately half of the light that has entered the half mirror 2213 passes through the half mirror 2213 to enter the eyepiece 222. On the other hand, the other half of the light that has entered the half mirror 2213 is reflected on the half mirror 2213 to enter the imaging unit 223.

Here, the lens unit 2212 includes a zooming lens 2214 (FIG. 2).

The zooming lens 2214 is formed by use of one or a plurality of lenses, and moves along an optical axis Ax (FIG. 2) to adjust the angle of view. The optical axis Ax is an axis extending in the vertical direction of FIG. 1. Specifically, the optical axis Ax is the axis from the microscope unit 22 toward the subject eye, and corresponds to an observation optical axis according to the present disclosure.

The lens unit 2212 also includes an optical zooming mechanism (not illustrated) for moving the zooming lens 2214 along the optical axis Ax.

The eyepiece 222 condenses the light incident from the observation optical system 221 to form an optical image of the subject eye. This allows the surgeon who looks through the eyepiece 222 to observe the optical image of the subject eye.

The imaging unit 223 includes an image sensor such as a charge coupled device (CCD) or a complementary metal oxide semiconductor (CMOS) that receives the light incident from the observation optical system 221 and converts the light into an electric signal. The imaging unit 223 then generates an image signal including the subject eye by image-capturing under the control of the control device 5.

The base unit 23 is a base of the surgical microscope 2, and is formed to be movable on a floor surface via casters 231 (FIG. 1).

The supporting unit 24 extends from the base unit 23, and supports the microscope unit 22 at a distal end thereof (end away from the base unit 23). As illustrated in FIG. 1, the supporting unit 24 includes an XY-stage 241, an XY-moving unit 242, and a Z-moving unit 243.

The XY-stage 241 supports the XY-moving unit 242 so that the XY-moving unit 242 may move in the X-direction and in the Y-direction. Here, the X-direction and the Y-direction are along a plane orthogonal to the optical axis Ax and are orthogonal to each other.

The XY-moving unit 242 is a part movable in the X-direction and in the Y-direction with respect to the XY-stage 241. The XY-moving unit 242 supports the Z-moving unit 243 so that the Z-moving unit 243 may move in the Z-direction. Here, the Z-direction is along the optical axis Ax (the vertical direction in FIG. 1) and is orthogonal to the X-direction and the Y-direction.

The Z-moving unit 243 is a part movable in the Z-direction with respect to the XY-moving unit 242. The Z-moving unit 243 supports the microscope unit 22.

To be specific, the microscope unit 22 may be moved in the X-direction and in the Y-direction by operating the XY-moving unit 242. Further, the microscope unit 22 may be moved in the Z-direction by operating the Z-moving unit 243.

As illustrated in FIG. 2, the driving unit 25 includes an XY-driving unit 251, a Z-driving unit 252, and a lens driving unit 253.

The XY-driving unit 251 is an actuator such as a motor, and under the control of the control device 5, the XY-driving unit 251 operates the XY-moving unit 242 and moves the microscope unit 22 in the X-direction and in the Y-direction.

The Z-driving unit 252 is an actuator such as a motor, and under the control of the control device 5, the Z-driving unit 252 operates the Z-moving unit 243 and moves the microscope unit 22 in the Z-direction.

The lens driving unit 253 is an actuator such as a motor, and under the control of the control device 5, the lens driving unit 253 operates the optical zooming mechanism (not illustrated) to adjust the angle of view.

The display device 3 is formed by a display using liquid crystal, organic electro luminescence (EL), or the like, and under the control of the control device 5, the display device 3 displays an image based on a video signal from the control device 5.

The input device 4 is formed by use of an operational device such as a mouse, a keyboard, and a touch panel, and receives user operation from a user such as a surgeon. The input device 4 then outputs an operation signal according to the user operation to the control device 5.

The control device 5 corresponds to a medical control device according to the present disclosure. The control device 5 collectively controls the operation of the surgical microscope 2 and the display device 3. As illustrated in FIG. 2, the control device 5 includes a communication unit 51, an image processing unit 52, a control unit 53, and a storage unit 54.

The communication unit 51 is an interface for communication with the surgical microscope 2, and receives an image signal generated by the imaging unit 223 and sends a control signal received from the control unit 53.

The image processing unit 52 corresponds to an image generation unit according to the present disclosure. The image processing unit 52 performs image processing on the image signal received by the communication unit 51, generates a video signal for display with which to display an image for display according to a captured image based on the image signal in the display device 3, and outputs the video signal to the display device 3.

Here, examples of the image processing include digital gain processing of multiplying the image signal (digital signal) received by the communication unit 51 by a digital gain for amplifying the digital signal, optical black subtraction processing, white balance (WB) adjustment processing, demosaic processing, color matrix calculation processing, gamma correction processing, YC conversion processing of generating a luminance signal and a color difference signal (Y, Cb/Cr signal), enlargement processing (electronic zoom), and the like.

The control unit 53 is implemented by, for example, a central processing unit (CPU), a field-programmable gate array (FPGA), and the like, controls the operation of the surgical microscope 2 and the display device 3, and controls the entire operation of the control device 5. The control unit 53 has functions of a determination unit and a state controller according to the present disclosure. The functions of the determination unit and the state controller are described in "operation of control device" later. Further, the control unit 53 may be configured, for example, as an IP converter having an image processing function. In such a case, the control unit 53 functions as an IP converter on the video source side that performs IP conversion on a video outputted from the surgical microscope 2 (video source) and sends the resultant over a network. The display device 3 is provided with an IP converter on the video output side that converts the video sent via the network into a format unique to the display device 3, and outputs the resultant. The IP converter on the video source side functions as an encoder, and the IP converter on the video output side functions as a decoder.

The storage unit 54 stores programs executed by the control unit 53, information necessary for the processing of the control unit 53, and so on.

About Cataract Surgery

Before the operation of the control device 5 is described, a brief description of the cataract surgery is given.

FIGS. 3A to 3E are diagrams for explanation of surgical tools used for cataract surgery. In FIGS. 3A to 3E, the reference sign "100" indicates the subject eye. In addition, the reference sign "110" indicates the cornea. Further, the reference sign "120" indicates a pupil.

In the cataract surgery, the surgeon performs a port creation step, an anterior capsulotomy step, a hydrodissection step, a crystalline lens nucleus treatment step, and an intraocular lens insertion step in the stated order.

Figure 3A:
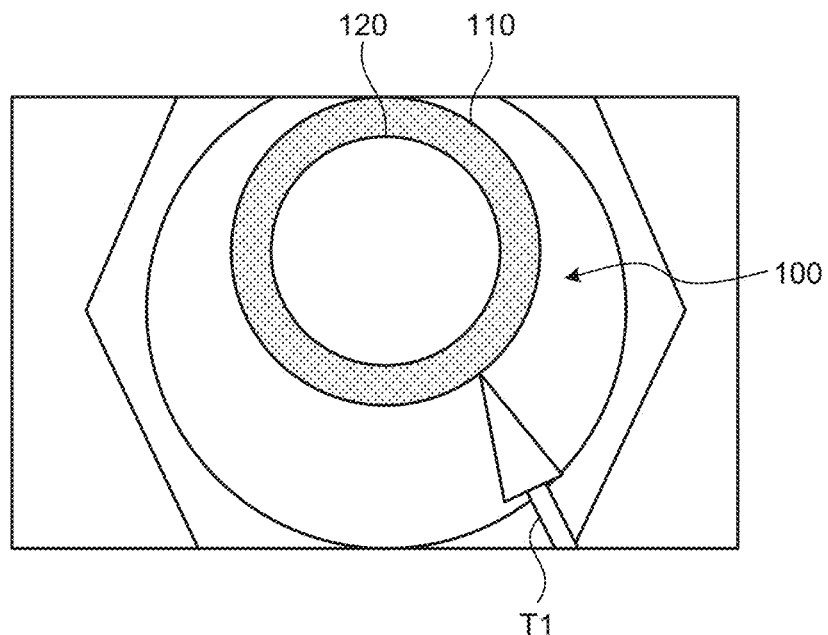
FIG. 3A is a diagram for explanation of a surgical tool used for cataract surgery.

In the port creation step, a knife T1 illustrated in FIG. 3A is used. The knife T1 corresponds to a first surgical tool according to the present disclosure. In the port creation step, the surgeon incises a cornea 110 of the subject eye 100 (FIG. 3A) with the knife T1 to define a port (incision).

Figure 3B:
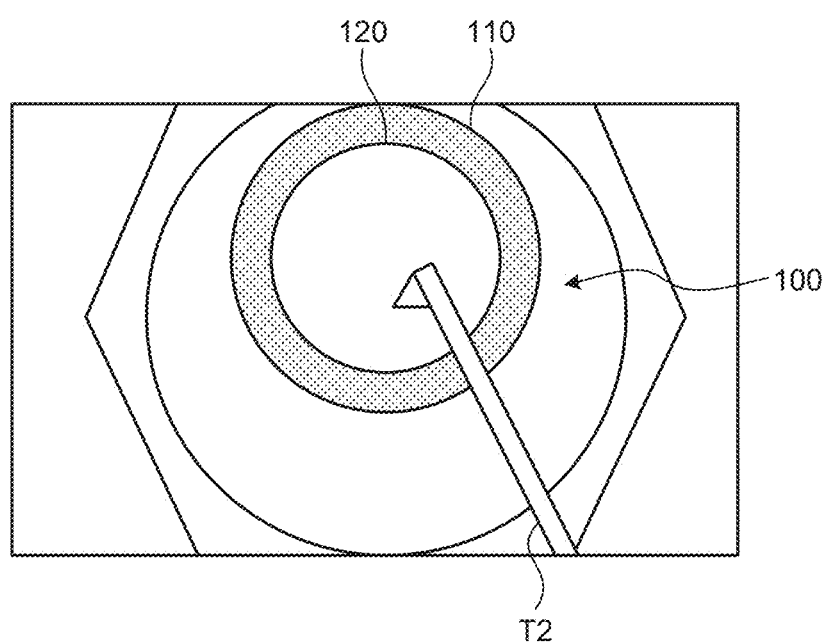
FIG. 3B is a diagram for explanation of a surgical tool used for cataract surgery.

The anterior capsulotomy step is called a continuous curvilinear capsulorrhexis (CCC) step. In the anterior capsulotomy step, tweezers T2 with a pointed distal end illustrated in FIG. 3B are used. The tweezers T2 correspond to a second surgical tool according to the present disclosure. In the anterior capsulotomy step, the surgeon inserts the tweezers T2 through the port defined in the port creation step and incises the anterior portion of the crystalline lens, that is, the anterior capsule portion in a circular shape.

Figure 3C:
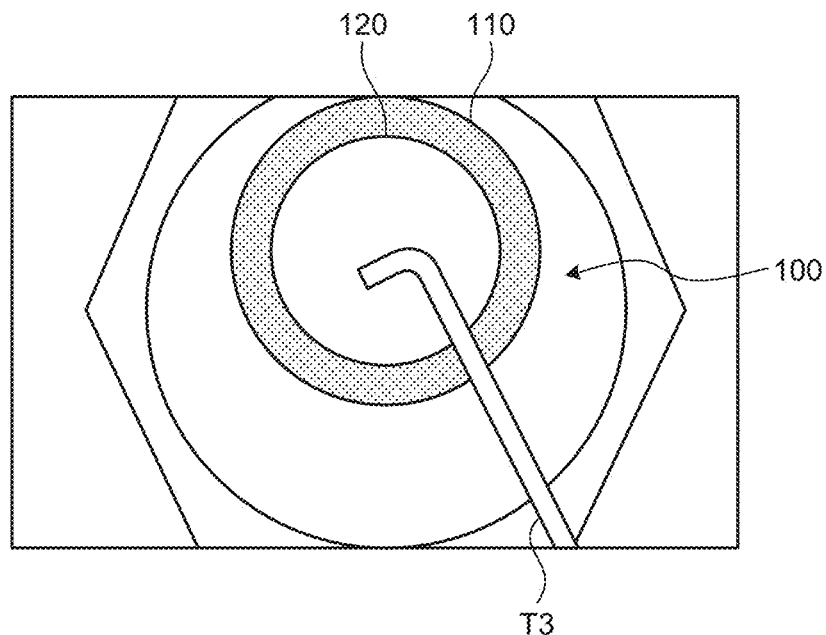
FIG. 3C is a diagram for explanation of a surgical tool used for cataract surgery.

In the hydrodissection step, a cannula T3 illustrated in FIG. 3C is used. The cannula T3 corresponds to a third surgical tool according to the present disclosure. In the hydrodissection step, the surgeon inserts the distal end of the cannula T3 between the crystalline lens capsule (the skin surrounding the crystalline lens) and the crystalline lens cortex through the port defined in the port creation step, and makes perfusate flow. This separates the crystalline lens capsule and the crystalline lens cortex from each other.

Figure 3D:
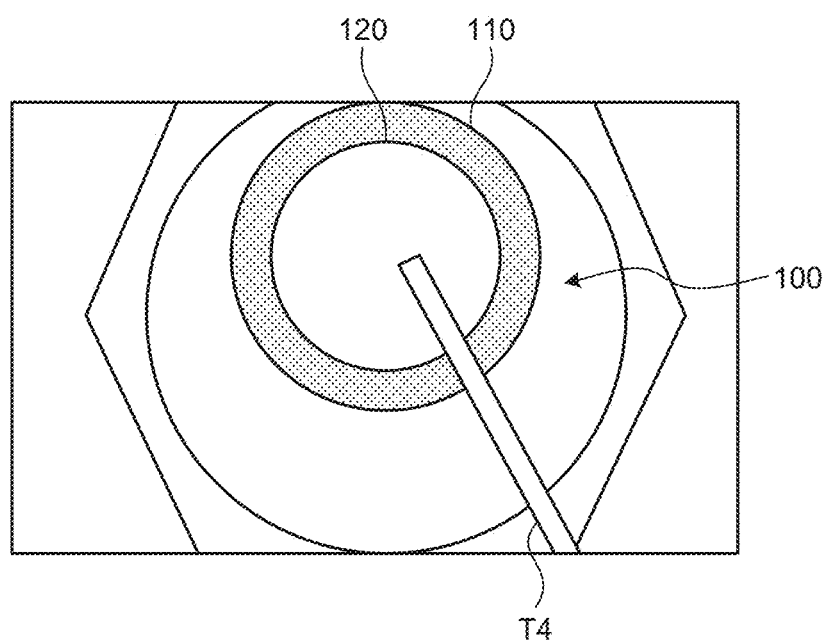
FIG. 3D is a diagram for explanation of a surgical tool used for cataract surgery.

In the crystalline lens nucleus treatment step, a suction tube T4 illustrated in FIG. 3D is used. The suction tube T4 corresponds to a fourth surgical tool according to the present disclosure. In the crystalline lens nucleus treatment step, the surgeon inserts the suction tube T4 through the port defined in the port creation step. The surgeon also performs emulsification (pulverization) and aspiration of the nucleus of the crystalline lens through the suction tube T4 by ultrasonic vibration called nucleus treatment, and also aspirates the cortex.

Figure 3E:
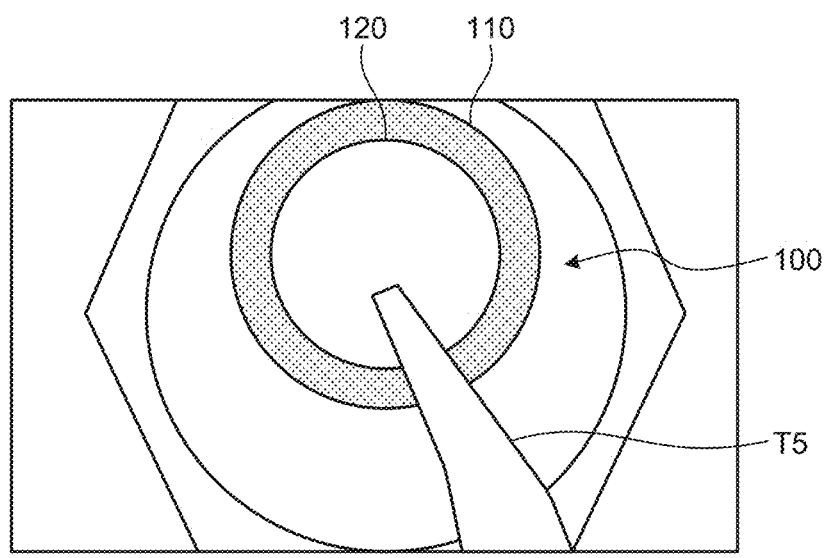
FIG. 3E is a diagram for explanation of a surgical tool used for cataract surgery.

In the intraocular lens insertion step, a cartridge T5 illustrated in FIG. 3E is used. The cartridge T5 corresponds to a fifth surgical tool according to the present disclosure. In the intraocular lens insertion step, first, the surgeon places an intraocular lens in the cartridge T5. The surgeon also inserts the cartridge T5 through the port defined in the port creation step, and pushes the intraocular lens out of the cartridge T5 and inserts the same into the subject eye.

Operation of Control Device

The description goes on to the operation of the control device 5. Hereinafter, the description is provided mainly of the functions of the determination unit of the control unit 53 and the state controller of the control unit 53 in the cataract surgery.

Figure 5:
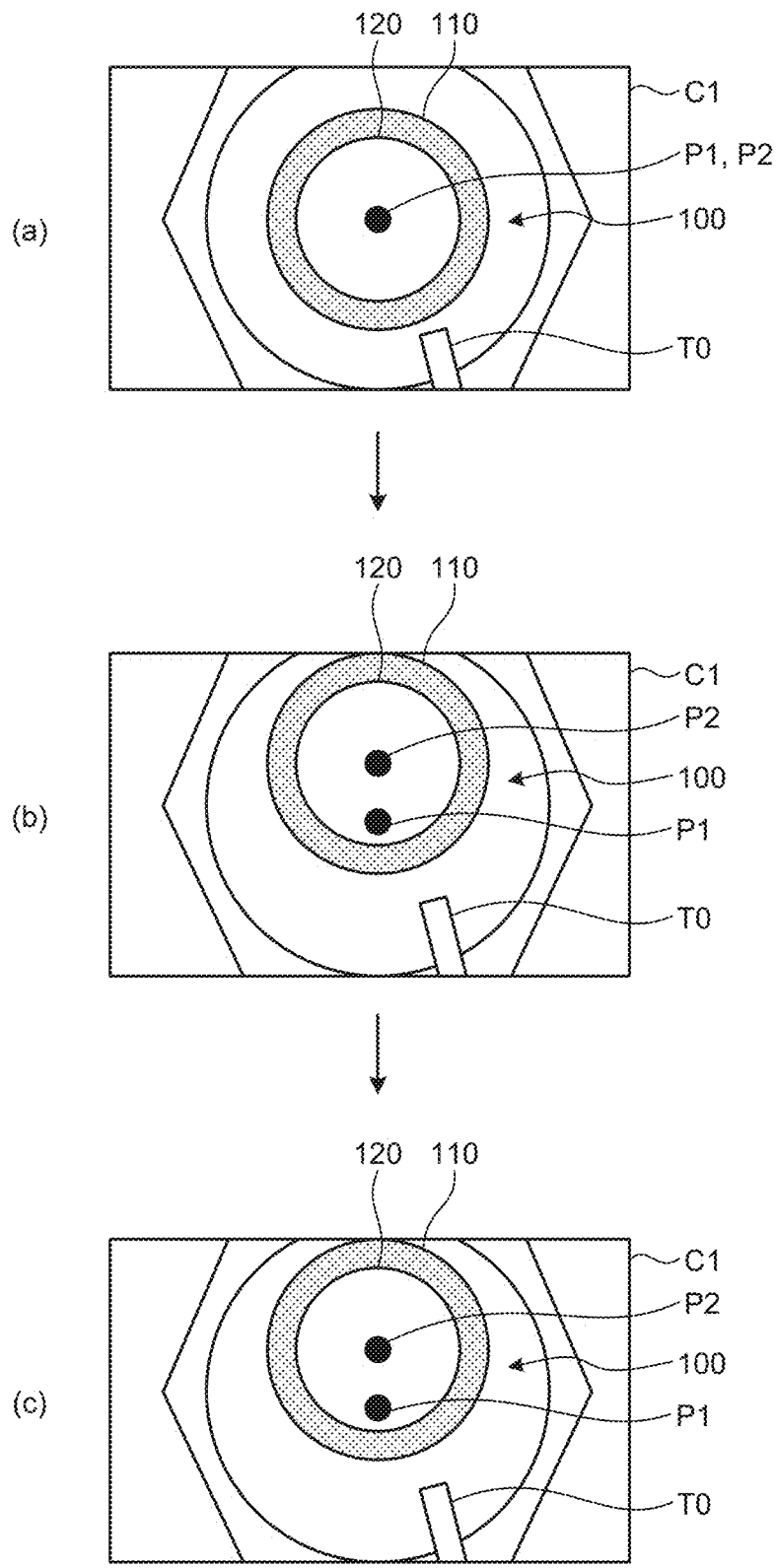
FIG. 5 is a diagram for explanation of a change in imaging field of view in a case where a specific surgical tool is included in a captured image.
Figure 6:
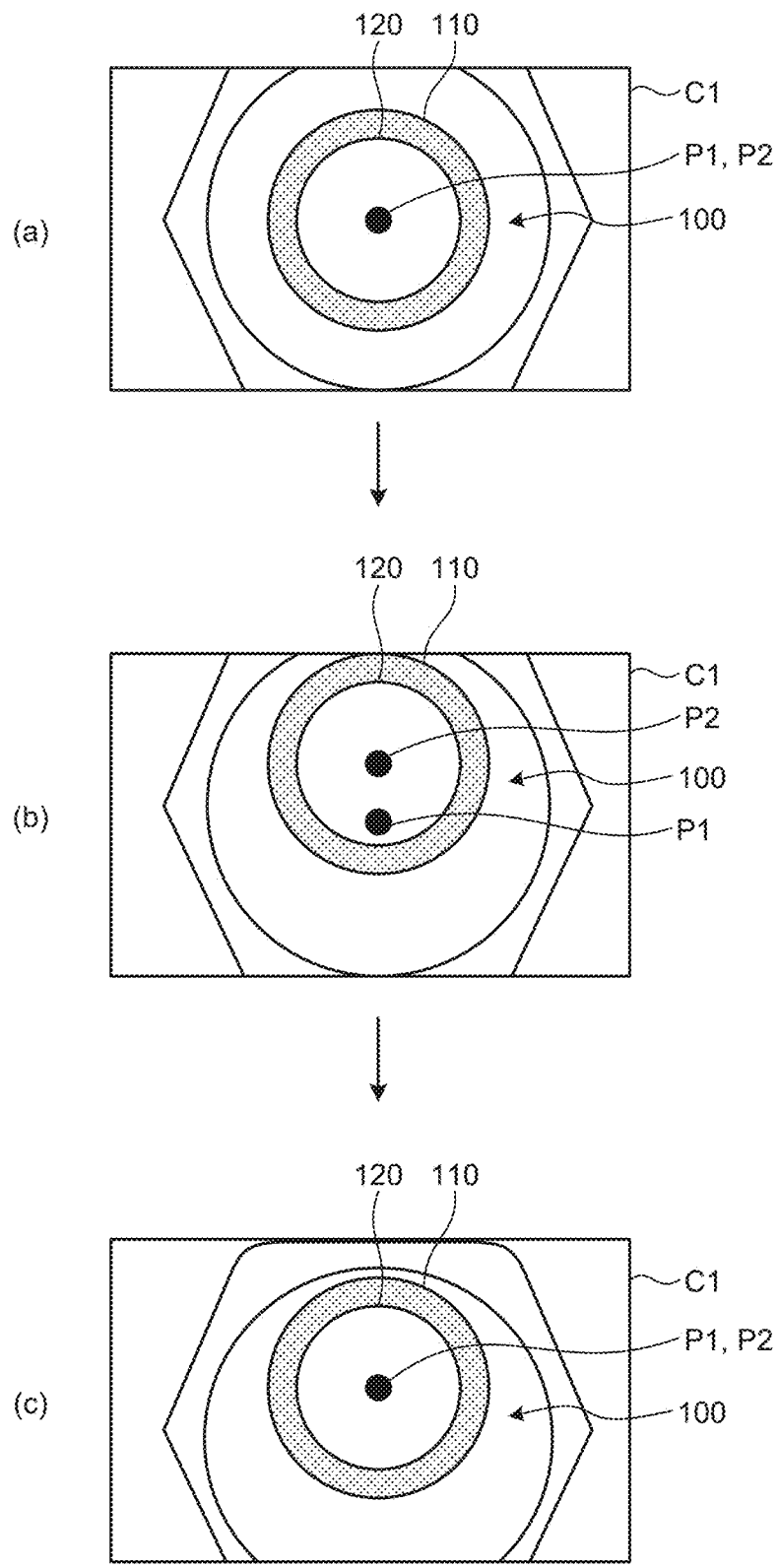
FIG. 6 is a diagram for explanation of a change in imaging field of view in a case where no specific surgical tool is included in a captured image.
Figure 7:
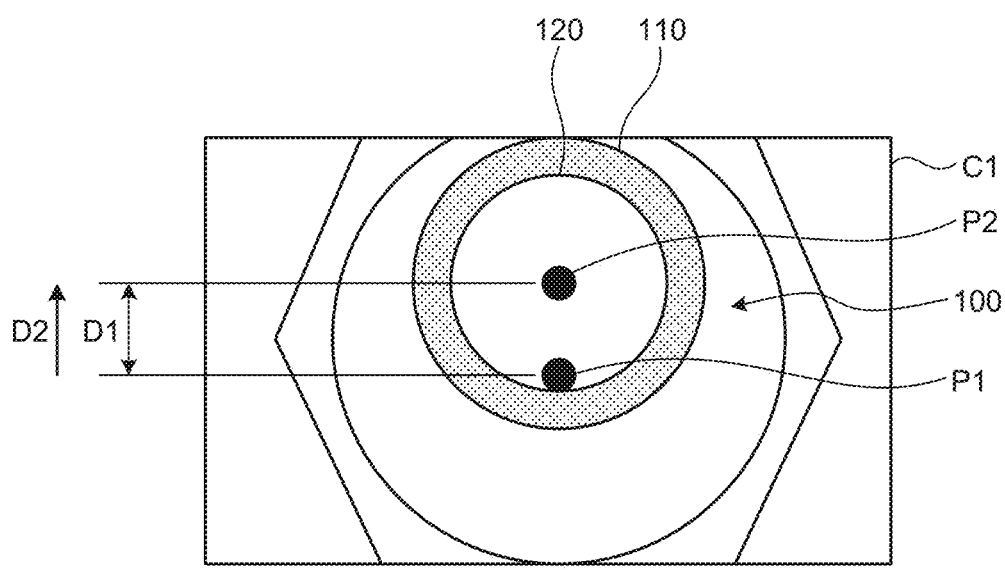
FIG. 7 is a diagram for explanation of Step S4.

FIG. 4 is a flowchart depicting operation of the control device 5. FIGS. 5 to 7 are diagrams for explanation of the operation of the control device 5.

First, the communication unit 51 acquires an image signal generated by the imaging unit 223 (Step S1). Then, the image processing unit 52 performs image processing on the image signal.

After Step S1, the control unit 53 (determination unit) executes surgical tool detection processing of detecting the usage of a specific surgical tool T0 (see FIG. 5) among the knife T1, the tweezers T2, the cannula T3, the suction tube T4, and the cartridge T5 (Step S2). Note that surgical tools other than the exemplified surgical tools may also be detected in the surgical tool detection processing as long as the surgical tools are registered or learned before surgery.

In this embodiment, in Step S2, the control unit 53 (determination unit) uses a known method such as image recognition using pattern matching or artificial intelligence (AI) for example to determine whether or not the specific surgical tool T0 is included in the captured image based on the image signal that has been subjected to the image processing by the image processing unit 52. The specific surgical tool T0 is at least one of the knife T1, the tweezers T2, the cannula T3, the suction tube T4, and the cartridge T5, and the specific surgical tool T0 is set by user operation (setting input) to the input device 4 by the user, for example. The setting input may be, for example, selecting (mode selection) any one of the steps of the port creation step, the anterior capsulotomy step, the hydrodissection step, the crystalline lens nucleus treatment step, and the intraocular lens insertion step, and the selection of any one of the steps allows at least any one of the surgical tools corresponding to that any one of the steps to be set as the specific surgical tool T0.

Then, when determining that the specific surgical tool T0 is included in the captured image after execution of the processing of Step S2 (Step S3: Yes), the control device 5 returns to the processing of Step S1.

FIG. 5 is a diagram for explanation a change in imaging field of view in a case where the specific surgical tool T0 is included in the captured image C1. Note that FIG. 5 illustrates a state in which the enlargement processing is not performed by the image processing unit 52 (zoom magnification of 1×), and the entire image area of the captured image C1 that has been subjected to the image processing by the image processing unit 52 is displayed in the screen of the display device 3 as an image for display.

For example, as illustrated in FIG. 5, in a case where the specific surgical tool T0 is included in the captured image C1, the control unit 53 does not execute the processing of Steps S4 and S5 described later. To be specific, even if a center position P2 of the subject eye 100 moves from a specific position P1 in the captured image C1 (FIG. 5(b)), the imaging field of view does not change, and the center position P2 remains deviated from the specific position P1 (FIG. 5(c)). Note that, in FIG. 5, the specific position P1 is used as the center position of the captured image C1 (the screen center of the display device 3); however, the specific position P1 is not limited thereto, and may be other positions. The same applies to FIGS. 6 and 7.

On the other hand, when determining that no specific surgical tool T0 is included in the captured image after execution of the processing of Step S2 (Step S3: No), the control unit 53 executes the processing of Steps S4 and S5 in this order.

FIG. 6 is a diagram for explanation of a change in imaging field of view in a case where no specific surgical tool T0 is included in the captured image C1. Note that FIG. 6 illustrates a case where none of the surgical tools of the knife T1, the tweezers T2, the cannula T3, the suction tube T4, and the cartridge T5 is included in the captured image C1. In addition, similarly to FIG. 5, FIG. 6 illustrates a state in which the enlargement processing is not performed by the image processing unit 52 (zoom magnification of 1×), and the entire image area of the captured image C1 that has been subjected to the image processing by the image processing unit 52 is displayed in the screen of the display device 3 as an image for display.

For example, as illustrated in FIG. 6, in a case where no specific surgical tool T0 is included in the captured image C1, the control unit 53 (state controller) executes the processing of Step S4.

FIG. 7 is a diagram for explanation of Step S4. Specifically, FIG. 7 is a diagram corresponding to FIG. 6(b).

Specifically, in Step S4, the control unit 53 (state controller) extracts at least one feature point from structural features in the subject eye 100 included in the captured image C1. For example, the control unit 53 (state controller) extracts at least one feature point based on at least one of the contour of the pupil 120, the contour of an iris (the contour of the cornea 110), the pattern of the iris, and the shape of the blood vessel of sclera in the subject eye 100. The control unit 53 (state controller) then recognizes the center position P2 of the subject eye 100 based on that at least one feature point. Further, the control unit 53 (state controller) calculates the movement amount in the X-direction and the Y-direction of the microscope unit 22 and the movement direction thereof necessary to make sure that the center position P2 is located at the specific position P1 based on the positional relationship (deviation amount D1 (FIG. 7) and deviation direction D2 (FIG. 7)) between the specific position P1 in the captured image C1 and the center position P2 of the subject eye 100.

After Step S4, the control unit 53 (state controller) executes the processing of Step S5.

Specifically, in Step S5, the control unit 53 (state controller) operates the XY-moving unit 242 through the XY-driving unit 251 to move the microscope unit 22 by the movement amount and in the movement direction calculated in Step S4.

As a result, in a case where the center position P2 of the subject eye 100 moves from the specific position P1 in the captured image C1 (FIG. 6(b)), the imaging field of view changes so as to maintain the state in which the center position P2 is located at the specific position P1 (FIG. 6(c)).

The embodiment described above achieves the following effects.

The control device 5 according to the embodiment controls the imaging field of view so as to maintain the state of the subject eye 100 in the captured image C1 (image for display) only in a case where it is determined that no specific surgical tool T0 is included in the captured image C1. More specifically, only in such a case, the control device 5 controls the imaging field of view by moving the microscope unit 22 in the X-direction and the Y-direction, thereby maintains the state in which the center position P2 of the subject eye 100 is located at the specific position P1 in the captured image C1.

Therefore, in a case where the specific surgical tool T0 is the knife T1 for example, even if the control of the imaging field of view is not executed, no more pressure from the knife T1 to the subject eye 100 is applied after the creation of the port, and the center position P2 of the subject eye 100 in the captured image C1 returns to the original position. On the other hand, in a case where a patient changes his/her posture or the patient moves his/her line of sight, the control of the imaging field of view is automatically executed, which eliminates the need for the surgeon to perform complicated work of operating the medical observation system 1 (XY-moving unit 242) to change the imaging field of view.

Therefore, according to the control device 5 of the embodiment, the control of the imaging field of view is executed only when necessary, which improves convenience.

Further, the control device 5 according to the embodiment recognizes the center position of the subject eye 100 based on at least one of the contour of the pupil 120, the contour of the cornea 110 (the contour of the iris), the pattern of the iris, and the shape of the blood vessel of the sclera in the subject eye 100 included in the captured image C1. Therefore, the control of the imaging field of view may be executed with high accuracy.

Further, the control device 5 according to the embodiment executes the control of the imaging field of view based on the positional relationship between the specific position P1 in the captured image C1 (the center position of the image for display) and the center position P2 of the subject eye 100. Therefore, the control of the imaging field of view may be executed with high accuracy by using simple calculation.

Other Embodiments

Although the embodiment for carrying out the present disclosure has been described so far, the present disclosure should not be limited only to the embodiment.

In the embodiment, the control unit 53 controls the imaging field of view to maintain the state in which the center position P2 of the subject eye 100 is located at a specific position in the image for display (the specific position P1 in the captured image C1); however, the present disclosure is not limited thereto.

For example, the control unit 53 may control the operation of the image processing unit 52 to maintain the state in which the center position P2 of the subject eye 100 is located at a specific position in the image for display. Specifically, the enlargement processing (electronic zoom) executed by the image processing unit 52 is processing of cutting out, from the captured image C1, a partial rectangular area (rectangular area according to a designated zoom magnification) of the entire image area in the captured image C1 and enlarging the image of the rectangular area at the zoom magnification. The control unit 53 then controls the operation of the image processing unit 52 to change the cut-out position of the partial area, and maintains the state in which the center position P2 of the subject eye 100 is located at a specific position in the image for display. In such a case also, as a method for recognizing the center position P2 of the subject eye 100, the method described in the first embodiment (method using the contour of the pupil 120 or the like) may be adopted. Further, as with the first embodiment, the control unit 53 changes the cut-out position of the partial area based on the positional relationship (the deviation amount D1 and the deviation direction D2) between the center position of the image for display and the center position P2 of the subject eye 100.

Further, for example, the control unit 53 may control the imaging field of view to maintain the state in which the subject eye 100 in the image for display has a specific size. Specifically, the control unit 53 operates the Z-moving unit 243 through the Z-driving unit 252 or moves the zooming lens 2214 along the optical axis Ax through the lens driving unit 253, and thereby maintains the state in which the subject eye 100 in the image for display has a specific size. Further, the control unit 53 may control the operation of the image processing unit 52 to maintain the state in which the subject eye 100 in the image for display has a specific size. For example, in the enlargement processing (electronic zoom) executed by the image processing unit 52, the state in which the subject eye 100 in the image for display has a specific size is maintained by changing the zoom magnification (magnification). As a result, for example, even in a situation where the size of the subject eye 100 in the image for display changes in response to a patient changing his/her posture, the size may be kept constant at all times. The surgeon thus may smoothly perform cataract surgery and the like while confirming the image for display.

Further, for example, as long as the surgical microscope 2 has a configuration in which the optical axis Ax may be inclined, the state in which the center position P2 of the subject eye 100 is located at a specific position in the image for display may be maintained by inclining the optical axis Ax (controlling the imaging field of view).

In the embodiment described above, the cataract surgery is exemplified; however, the medical observation system 1 according to the present disclosure is of course applicable to other eye surgery such as vitreoretinal surgery.

Note that the following configurations also falls within the technical scope of the present disclosure.

(1) A medical control device including: a determination unit configured to determine whether or not a specific surgical tool is included in a captured image based on an image signal generated by an imaging device that captures an image of a subject eye; an image generation unit configured to generate an image for display based on the image signal; and a state controller configured to control, in a case where the determination unit determines that the specific surgical tool is not included in the captured image, operation of the image generation unit or an imaging field of view by the imaging device so as to maintain a state of the subject eye in the image for display.

(2) The medical control device according to (1), in which the state controller controls the imaging field of view to maintain a state in which a center position of the subject eye is located at a specific position in the image for display.

(3) The medical control device according to (2), in which the state controller recognizes the center position of the subject eye based on a structural feature of the subject eye included in the captured image.

(4) The medical control device according to (3), in which the structural feature of the subject eye is at least one of a contour of a pupil, a contour of an iris, a pattern of the iris, and a shape of a blood vessel of sclera in the subject eye.

(5) The medical control device according to any one of (2) to (4), in which the state controller controls the imaging field of view based on a positional relationship between a center position of the image for display and a center position of the subject eye included in the image for display.

(6) The medical control device according to any one of (2) to (5), in which the state controller moves, in the control of the imaging field of view, the imaging device in a plane orthogonal to an observation optical axis from the imaging device toward the subject eye.

(7) The medical control device according to (1), in which a state of the subject eye in the image for display is a size of the subject eye in the image for display.

(8) The medical control device according to (7), in which the state controller controls the imaging field of view to maintain a state in which the size of the subject eye in the image for display is a specific size.

(9) The medical control device according to (8), in which the state controller moves, in the control of the imaging field of view, the imaging device in a direction along an observation optical axis from the imaging device toward the subject eye.

(10) The medical control device according to (8), in which the state controller changes a magnification by a zooming lens included in the imaging device in the control of the imaging field of view.

(11) The medical control device according to (7), in which the image generation unit generates the image for display by cutting out and enlarging a partial area of the captured image, and the state controller controls a magnification of the partial area in the image generation unit to maintain a state in which the size of the subject eye in the image for display is a specific size.

(12) The medical control device according to (1), in which the state controller controls operation of the image generation unit to maintain a state in which a center position of the subject eye is located at a specific position in the image for display.

(13) The medical control device according to (12), in which the state controller recognizes a center position of the subject eye based on a structural feature of the subject eye included in the captured image.

(14) The medical control device according to (13), in which the structural feature of the subject eye is at least one of a contour of a pupil, a contour of an iris, a pattern of the iris, and a shape of a blood vessel of sclera in the subject eye.

(15) The medical control device according to any one of (12) to (14), in which the image generation unit cuts out a partial area of the captured image to generate the image for display, and the state controller controls operation of the image generation unit to change a cut-out position of the partial area.

(16) The medical control device according to (15), in which the state controller changes the cut-out position of the partial area based on a positional relationship between a center position of the image for display and a center position of the subject eye included in the image for display.

(17) The medical control device according to any one of (1) to (16), in which the specific surgical tool is a surgical tool used for cataract surgery, and is at least one of a first surgical tool used for creation of a port, a second surgical tool used for incision of an anterior capsule, a third surgical tool used for hydrodissection, a fourth surgical tool used for crystalline lens nucleus treatment, and a fifth surgical tool used for insertion of an intraocular lens.

(18) A medical observation system including: an imaging device configured to capture an image of a subject eye; and a medical control device configured to process an image signal generated by the imaging device, in which the medical control device includes a determination unit configured to determine whether or not a specific surgical tool is included in a captured image based on the image signal; an image generation unit configured to generate an image for display based on the image signal; and a state controller configured to control, in a case where the determination unit determines that the specific surgical tool is not included in the captured image, operation of the image generation unit or an imaging field of view by the imaging device so as to maintain a state of the subject eye in the image for display.

The medical control device and the medical observation system according to the present disclosure may improve convenience.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A medical control device comprising:
determination circuitry configured to determine whether or not a specific surgical tool is included in a captured image based on an image signal generated by an imaging device configured to capture an image of a subject eye;

image generation circuitry configured to generate an image for display based on the image signal; and control circuitry configured to, in a case where the determination circuitry determines that the specific surgical tool is not included in the captured image, automatically control operation of the image generation circuitry or an imaging field of view by the imaging device so as to maintain a state of the subject eye in the image for display, and, in a case where the determination circuitry determines that the specific surgical tool is included, to refrain from automatically controlling the operation of the image generation circuitry or the imaging field of view by the imaging device to maintain the state of the subject eye in the captured image.

2. The medical control device according to claim 1, wherein the control circuitry is configured to control the imaging field of view to maintain a state in which a center of the subject eye is located at a specific position in the image for display.

3. The medical control device according to claim 2, wherein the control circuitry is configured to recognize the center of the subject eye based on a structural feature of the subject eye included in the captured image.

4. The medical control device according to claim 3, wherein the structural feature of the subject eye is at least one of: a contour of a pupil; a contour of an iris; a pattern of the iris, and a shape of a blood vessel of sclera in the subject eye.

5. The medical control device according to claim 2, wherein the control circuitry is configured to control the imaging field of view based on a positional relationship between a center position of the image for display and the center of the subject eye included in the image for display.

6. The medical control device according to claim 2, wherein the control circuitry is configured to move, in the control of the imaging field of view, the imaging device in a plane orthogonal to an observation optical axis from the imaging device toward the subject eye.

7. The medical control device according to claim 1, wherein a state of the subject eye in the image for display is a size of the subject eye in the image for display.

8. The medical control device according to claim 7, wherein the control circuitry is configured to control the imaging field of view to maintain a state in which the size of the subject eye in the image for display is a specific size.

9. The medical control device according to claim 8, wherein the control circuitry is configured to move, in the control of the imaging field of view, the imaging device in a direction along an observation optical axis from the imaging device toward the subject eye.

10. The medical control device according to claim 8, wherein the control circuitry is configured to change a magnification by a zooming lens included in the imaging device in the control of the imaging field of view.

11. The medical control device according to claim 7, wherein the image generation circuitry is configured to generate the image for display by cutting out and enlarging a partial area of the captured image, and the control circuitry is configured to control a magnification of the partial area in the image generation circuitry to maintain a state in which the size of the subject eye in the image for display is a specific size.

12. The medical control device according to claim 1, wherein the control circuitry is configured to control operation of the image generation circuitry to maintain a state in which a center of the subject eye is located at a specific position in the image for display.

13. The medical control device according to claim 12, wherein the control circuitry is configured to recognize a center of the subject eye based on a structural feature of the subject eye included in the captured image.

14. The medical control device according to claim 13, wherein the structural feature of the subject eye is at least one of: a contour of a pupil; a contour of an iris; a pattern of the iris; and a shape of a blood vessel of sclera in the subject eye.

15. The medical control device according to claim 12, wherein the image generation circuitry is configured to cut out a partial area of the captured image to generate the image for display, and the control circuitry is configured to control operation of the image generation circuitry to change a cut-out position of the partial area.

16. The medical control device according to claim 15, wherein the control circuitry is configured to change the cut-out position of the partial area based on a positional relationship between a center position of the image for display and a center of the subject eye included in the image for display.

17. The medical control device according to claim 1, wherein the specific surgical tool is a surgical tool used for cataract surgery, and the specific surgical tool is at least one of: a first surgical tool used for creation of a port; a second surgical tool used for incision of an anterior capsule; a third surgical tool used for hydrodissection; a fourth surgical tool used for crystalline lens nucleus treatment; and a fifth surgical tool used for insertion of an intraocular lens.

18. A medical observation system comprising:

an imaging device configured to capture an image of a subject eye; and a medical control device configured to process an image signal generated by the imaging device, wherein the medical control device includes determination circuitry configured to determine whether or not a specific surgical tool is included in a captured image based on the image signal;

image generation circuitry configured to generate an image for display based on the image signal; and control circuitry configured to control, in a case where the determination circuitry determines that the specific surgical tool is not included in the captured image, operation of the image generation circuitry or an imaging field of view by the imaging device so as to maintain a state of the subject eye in the image for display, and, in a case where the determination circuitry determines that the specific surgical tool is included, to refrain from automatically controlling the operation of the image generation circuitry or the imaging field of view by the imaging device to maintain a state of the subject eye in the captured image.

19. A method of controlling a display of an image of a subject eye, the method comprising:

receiving a captured image of the subject eye;

determining whether or not a specific surgical tool is included in the captured image of the subject eye;

in response to the specific surgical tool not being in the captured image, automatically maintaining a state of the subject eye in an image for display by controlling operation of image generation circuitry or an imaging field of view of an imaging device;
in response to the specific surgical tool being in the captured image, refraining from automatically maintaining a state of the subject eye in the captured image; and
generating the image for display.

20. A non-transitory computer readable medium storing thereon a program, which, when executed by a processor, causes the processor to execute the method of claim 19.

* * * * *